UNITED STATES PATENT OFFICE 2,581,951

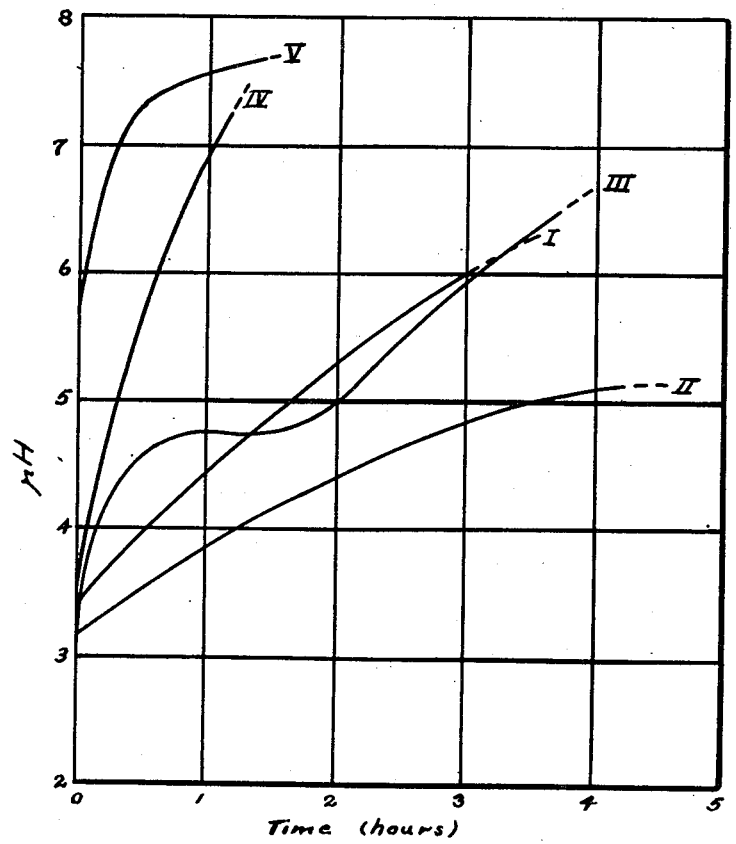

COPPER COMPOUNDS AND MANUFACTURE THEREOF

William J. Harshaw, Shaker Heights, and John O. Hay, Cleveland Heights, Ohio, assignors to The Harshaw Chemical Company, Cleveland, Ohio, a corporation of Ohio Application May 14, 1945, Serial No. 593,638

3 Claims. (Cl. 167—16)

This invention relates to basic copper compositions and methods of manufacturing them.

Prior to our invention numerous basic copper salts have been produced usually having a number of $Cu(OH)_2$ groups corresponding to the formula $CuSO_4.3Cu(OH)_2$. Marsh et al. (U. S. Patent No. 2,104,754, issued January 11, 1938) succeeded in obtaining a higher proportion of $Cu(OH)_2$ groups by the use of a method involving the use of metallic copper and air in an ammoniacal solution. Products made in accordance with the process of the Marsh patent may have a number of $Cu(OH)_2$ groups corresponding to the formula $\frac{1}{2}CuSO_4.\frac{1}{2}CuCl_2.5Cu(OH)_2$ or even higher. Compositions of such high basicity are useful as fungicides and have been adopted to a substantial extent for such use. Products made in accordance with the Marsh process are very light fluffy materials and for some purposes are regarded as superior to other copper fungicides.

We have now discovered a simpler process by means of which we are able to produce copper compositions comparable to those produced by the Marsh process for fungicidal use. In accordance with our invention, we bring together in intimate admixture suitable anions such as sulfate, chloride, nitrate or a mixture of a plurality thereof, true copper hydroxide and water. A reaction occurs at the surface of each particle of copper hydroxide forming basic copper salts which extend from the surface of each particle toward the center to a depth depending upon the various factors of concentration, time, temperature, etc.

In accordance with our invention we may treat copper hydroxide with a substance of the class consisting of the sulfates, chlorides and nitrates of hydrogen, ammonium, copper, zinc, manganese, iron and aluminum and mixtures of a plurality thereof. The treatment may be carried out in suspension in an aqueous medium in the form of a slurry the particles of which are kept in suspension by agitating the reaction mixture. The treatment may be continued until the desired proportion of the copper hydroxide has been converted to basic copper hydroxide, suitably until there are present from 4 to 15 $Cu(OH)_2$ groups per sulfate equivalent anion group, preferably from 4 to 8.

The anions may be supplied to the initial reaction mixture by adding acid such as sulfuric, hydrochloric, nitric or a mixture of a plurality thereof. They also may be supplied by the use of the corresponding copper salts or the corresponding ammonium salts, either one or a plurality. We have found that the reaction goes very readily if the anions or some part thereof are supplied by an ammonium salt or salts such for example as ammonium chloride. This is especially desirable in the case of compositions containing both chloride and sulfate as will be obvious from the accompanying drawings wherein the figure is a graphic representation of the initial reaction rates, plotting time against pH value.

The drawing, wherein the figure is a graph showing initial reaction rates, indicates, as will be pointed out more specifically below, that the use of ammonium chloride as a source of anions in the initial solution is desirable.

We are able to obtain on the average from 4 to 6 $Cu(OH)_2$ groups or higher per copper salt group but we consider an average of 5 to be optimum for fungicidal uses. That is, five "$(OH)_2$" groups for each group of the class, $SO_4$, $Cl_2$, $(NO_3)_2$, e. g., $CuCl_2.5Cu(OH)_2$ or $CuSO_4.5Cu(OH)_2$. Our process differs fundamentally from the process of Marsh in that Marsh builds a more highly basic exterior upon a less basic core whereas we modify a highly basic particle by rendering less basic the exterior thereof. Our particle therefore may have a less basic exterior which is less likely to burn plant tissue while having a high average basicity. This will depend upon the particle size of the particle of copper hydroxide and upon other factors.

The properties of the resulting compositions for certain purposes may be advantageously modified by the use of the salts of modifying metals as the source of the anion. For example, we may use the sulfates or chlorides of such metals as zinc, manganese, iron, aluminum or the like. These will react with the particles of copper hydroxide to form basic mixed metal compositions having a high average ratio of $Cu(OH)_2$ groups which are desirable for modifying phytotoxicity, anti-cryptogamic properties or physical characteristics, or for incorporation of minor element plant nutrient values. Since these metals form basic salts or insoluble hydroxides, these are precipitated as the soluble salts diffuse into the particle of copper hydroxide in such manner that they become an integral part of the molecular structure or at least of the individual basic copper particle.

The reaction is a comparatively slow one since it is essentially one of diffusion and copper hydroxide releases hydroxyl ions rather slowly as compared to the more commonly used bases such as the hydroxides of sodium, magnesium or calcium. The reaction may continue for several hours under the conditions which we have chosen for our examples and which are the conditions which we prefer to employ. The use of ammonia increases the initial rate of reaction as shown by comparing curve I with curve II. The elevation of the reaction temperature from room temperature to 70° C. was more or less comparable to the use of ammonium chloride as indicated by comparing curves I and III. We may carry out the reaction at any temperature from 0° C. to 100° C. but prefer a temperature between 20° C. and 85° C. and a reaction time of at least one hour and preferably from 3 hours to 15 hours.

We prefer to use enough of the source of anion or anions to produce an average of from 4 to 15 $Cu(OH)_2$ groups per sulfate equivalent anion group (by which we mean $SO_4$ or $Cl_2$ or $(NO_3)_2$, etc.), most desirably from 4 to 8 and an amount of free water which may vary from zero when one of the reactants contains water of crystallization to the extent of 14–15% of the copper hydroxide by weight to five times the weight of copper hydroxide employed. Where no modifying metals are used the anion may be supplied by copper salts such as copper chloride or copper sulfate. The proportion of ammonium chloride to increase the reaction rate may vary from 0 to 15% of the copper hydroxide by weight or if we desire to use it for furnishing all or a substantial portion of the anions the proportion may be as much as 30% of the expected weight of product. The proportions of modifying metals is not sharply critical but preferably should be in the aggregate from 0 to 35% of the final product by weight.

In the preferred practice of our invention we bring into contact for each 1000 parts by weight of copper hydroxide from 140 to 2000 parts by weight of water and sufficient of an anion or a mixture of anions to produce from 4 to 15 $Cu(OH)_2$ groups per sulfate equivalent anion group, preferably from 4 to 8. Preferably water should be used either in very small quantity so as to avoid filtering and minimize drying or in proportion to form a slurry thin enough to permit thorough agitation. If the minimum amount of water is used it may be present in the form of water of hydration of one of the ingredients, e. g. copper sulfate, pentahydrate, and may be released by the reaction and thus furnish enough moisture. We may rely upon the water of hydration to furnish a part of the moisture and add water to complete the amount needed. The heat of reaction serves to elevate the temperature aiding in accelerating the formation of the basic compound. Mixing is required only in the initial stages as the material may then be cured to the proper pH by permitting it to stand for a period of time. If water is to be used to an extent requiring filtration we prefer to use about 2000 parts of water to 1000 parts of copper hydroxide. We are then able to agitate the reaction mixture thoroughly instead of mixing in a doughy or semi-dry state as when the minimum of water is used.

It will be observed that we eliminate the washing out of soluble salts attendant on the usual manner of preparing basic copper compounds and when minimum water is used we also eliminate filtration and much of the drying otherwise required. If an ammonia salt is used as a source of anions we drive off the ammonia on drying at an elevated temperature and even in that case avoid washing and may avoid filtration and reduce drying by using the minimum of water.

In the drawings we have plotted time against pH, it being understood that the increase in pH value is proportional to the progress of the reaction.

The following specific examples will serve to illustrate the invention:

Example I 500 g. of copper hydroxide as a powder was added to a stirred solution of 1000 cc. of water in which was dissolved 165 g. copper chloride, 78.5 g. of copper sulfate and 10 g. of ammonium chloride. The reaction was carried out at room temperature and the initial rate of reaction is shown by curve I. The final dried product was filtered at pH of 7.05 and amounted to 678.5 g. at 58.44% copper and 25.15% hydroxyl. The composition contained on the average 4.1 $Cu(OH)_2$ groups per sulfate equivalent anion group.

Example II

Same amounts of reagents and procedure as shown in Example I except ammonium chloride was omitted. The initial reaction rate is shown by curve II. Filtered at pH 7.0 the dried cake weighed 670.5 g. at 58.25% copper and 25.22% hydroxyl which calculated to 4.3 $Cu(OH)_2$ groups per sulfate equivalent anion group.

Example III

Same amounts of reagents and procedure as shown in Example II except temperature of reaction was 70° C. The initial reaction rate is given by curve III. The dried cake weighed 676 g. and contained 58.34% copper and 25.13% hydroxyl. It calculated 4.1 $Cu(OH)_2$ groups per sulfate equivalent anion group.

Example IV 500 g. of copper hydroxide was added to a solution of 1000 cc. of water in which was dissolved 134 g. of copper chloride. The reaction was carried out with stirring at 70° C. The initial rate of reaction is shown by curve IV. The slurry was filtered at pH 7.4 and the dried cake weighed 601 g. It analyzed 60.24% copper and 28.15% hydroxyl and calculated 6.9 $Cu(OH)_2$ groups per sulfate equivalent anion group.

Example V 500 g. of copper hydroxide was added to a solution of 1000 cc. of water in which was dissolved 200 g. of copper sulfate. The reaction was carried out with stirring at room temperature. The reaction rate is given by curve V. The slurry was filtered at pH 7.9 and the dried cake weighed 623 g. It contained 58.11% copper and 27.17% hydroxyl calculating 6.3 $Cu(OH)_2$ groups per sulfate equivalent anion group.

Example VI 500 g. of copper hydroxide was added to a solution of 1000 cc. of water in which was dissolved 200 g. of copper nitrate. The reaction was carried out with stirring partly at room temperature and partly at 70° C. The slurry was filtered at pH 5.7 and the dried cake weighed 653 g. It analyzed 56.49% copper and 26.11% hydroxyl and calculated 5.1 $Cu(OH)_2$ groups per sulfate equivalent anion group.

Example VII 500 g. of copper hydroxide was added to a solution of 1000 cc. of water in which was dissolved 50 g. of manganese chloride and 150 g. of zinc sulfate. The reaction was carried out with stirring at room temperature. The slurry was filtered at a pH of 6.8. The dried cake weighed 684 g. and contained 50.93% copper, 1.56% manganese, 5.22% zinc and 27.18% hydroxyl.

Example VIII 500 g. of copper hydroxide was added to a solution of 1000 cc. of water in which was dissolved 100 g. of ferric chloride and 100 g. of aluminum sulfate. The reaction was carried out with stirring at room temperature. The slurry was filtered at pH 6.0 and the dried cake weighed 612.5 g. It contained 53.35% copper, 3.24% iron, 3.35% aluminum and 27.39% hydroxyl.

Example IX 500 g. of copper hydroxide was mixed with 250 cc. of water to make a moist powder. To this was added 165 g. of copper chloride and 78.5 g. of copper sulfate. As mixing was continued and the water of hydration was released the mix became a stiff mud. Kneading was continued for about 2 hours with a rise in temperature from 25° to 40° C. About 40 cc. more water was added to maintain a mixable mud. The material at this point when a sample was placed in suspension in water in the form of a thick slurry gave a pH of 5.5. Discontinuing the stirring and permitting to stand overnight the pH on a sample similarly suspended rose to 7.4. The mix was then dried in an oven to a cake weighing 670 g. and analyzing 57.51% copper and 24.8% hydroxyl. This is calculated to approximately 4.2 $Cu(OH)_2$ groups per sulfate equivalent anion group.

Example X

An intimate mechanical mixture was made containing 200 g. of powdered cupric sulfate, pentahydrate and 500 g. of copper hydroxide. This was divided into six unequal portions each of which was treated in a different manner to induce the reaction forming basic copper sulfate. The most successful method was heating the mix for 30 minutes at 110° C. in a stoppered glass jar. The pH of the initial mix (a test sample slurried in a little water) was 4.9 but after the 30 minute treatment a test sample in water slurry had a pH of 7.5. The material changed from blue to blue-green. The bottle was unstoppered and the contents which were moist were allowed to cure and dry overnight at 80° C. The resulting blue-green product was in a powder form. It analyzed 58.01% copper, and 26.80% hydroxyl. The clear filtrate from a water suspension of the material showed no soluble copper when tested by the ferrocyanide reaction.

Having thus described our invention, what we claim is:

1. A process of making highly basic copper-containing compositions comprising treating solid particles of copper hydroxide with copper sulfate, copper chloride and ammonium chloride in aqueous medium in the form of a slurry, continuing the treatment while maintaining the solid particles in suspension by agitating the mixture until the solid portion thereof has between 4 and 15 $Cu(OH)_2$ groups per copper atom attached to $SO_4$ and $Cl_2$ and then separating the solid portion of the reaction mixture from the liquid portion thereof.

2. In a process of making basic copper-containing compositions, the step of reacting solid particles of copper hydroxide in aqueous medium with a heavy metal salt of the class consisting of the sulfates, chlorides, and nitrates of copper, zinc, manganese, iron and aluminum for a time sufficient to convert a superficial portion only of such solid particles to less basic salts.

3. The invention as defined in claim 2 further characterized in that there is present in the reaction mixture from 2 to 15% of ammonium chloride based on the weight of the copper hydroxide.

WILLIAM J. HARSHAW.
JOHN O. HAY.

REFERENCES CITED

The following references are of record in the file of this patent:

UNITED STATES PATENTS

| Number | Name | Date |
|---|---|---|
| 1,598,982 | Newhall | Sept. 7, 1926 |
| 1,620,490 | Sanders | Mar. 8, 1927 |
| 1,642,370 | Jenkins et al. | Sept. 13, 1927 |
| 1,786,125 | O'Kane | Dec. 23, 1930 |
| 1,937,524 | Marsh et al. | Dec. 5, 1933 |
| 2,079,953 | Souviron | May 11, 1937 |
| 2,104,754 | Marsh et al. | Jan. 11, 1938 |
| 2,264,212 | Large | Nov. 25, 1941 |
| 2,370,157 | Furness | Feb. 27, 1945 |